Dec. 5, 1944.  A. V. SIMS  2,364,395
GRANULAR SUPPORT
Filed Sept. 16, 1941  2 Sheets-Sheet 1
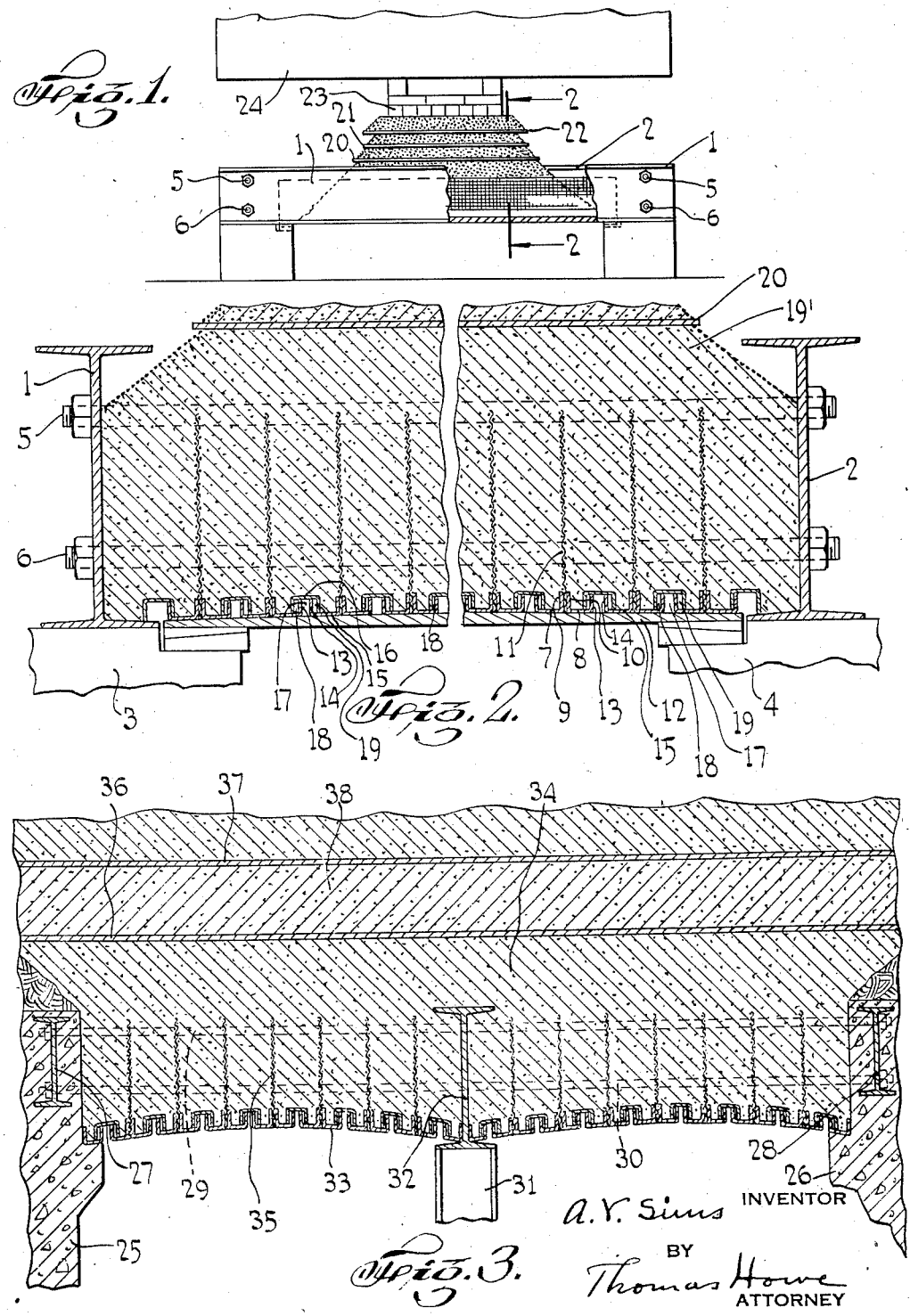

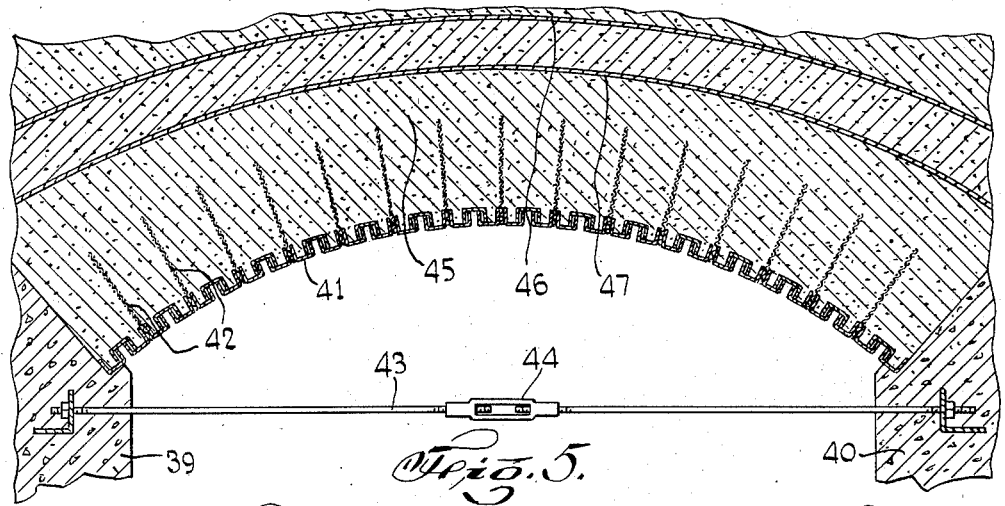
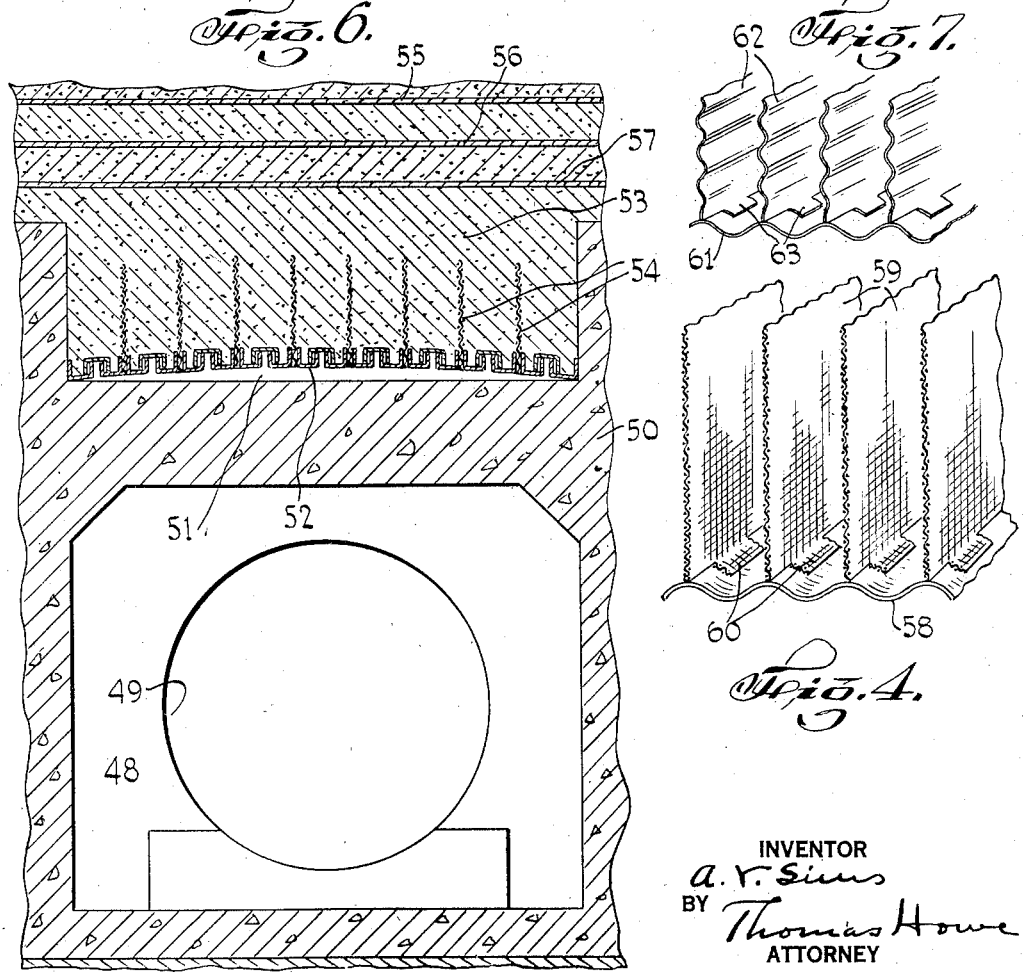

Patented Dec. 5, 1944

2,364,395

UNITED STATES PATENT OFFICE 2,364,395

GRANULAR SUPPORT

Alfred V. Sims, New York, N. Y.; Alfred William Sims executor of said Alfred Varley Sims, deceased Application September 16, 1941, Serial No. 411,033

2 Claims. (Cl. 72—55)

The present invention relates to supports for flooring and other structures required to support weights and also may be made use of in roofing which may be heavy in itself or may be likely to be subjected to weights and particularly large weights.

The present invention makes use of, and is an improvement upon, the subject matter of my Patent No. 805,386, patented November 21, 1905. In the structure of such patent, plates are placed within the sand or other granular substance, the sand being suitably supported against gravity and the plates intersecting the line of stress in the sand when the structure is subjected to a load. In this structure of my prior patent referred to the friction between the granular substance and the interposed plates therein whereby the downward movement of the granular substance by gravity is resisted, is an important feature.

It is one of the objects of the present invention to provide an improved structure whereby the engagement between the granular substance and the plates embedded in it may be greatly increased so that the granular substance will be more firmly and strongly held against movement along the surface of the plate. This is accomplished by affording cavities or openings in the side of the plate wherein the granules of the granular substance may find lodgement so as to strongly prevent the substance from moving along the surface of the plate. In order to find "lodgement" as referred to herein for a granule of the granular matter, it is not necessary that the granule should be completely entered within the recess or opening, but it need only be entered sufficiently therein to engage within the space of the recess or opening so that there is firm engagement against movement of the granule along the plate.

It is one of the objects of the invention to provide a structure comprising sand or other granular substance in which the plates are embedded, which plates have recesses for the lodgement of granules of the granular substance.

Such plates may be made by employing foraminous plates in the structure as specified. In additon to increasing the grip or engagement between the granular substance and the plate, to prevent the sliding of the substance along the side of the plate, the openings in the foraminous plate permit the granular material to work therethrough to effect normal piling or otherwise consolidating the mass. And it is a further object to provide a structure including such plates. Such foraminous plates may be formed of expanded metal.

A cheap and efficient form of foraminous plate is found in the use of wire screen formed by interweaving metal wires to form meshes between the wires. It is a further object of the invention to provide a structure embodying plates consisting of such meshed wire screen.

Also the necessary lodgement of the granules and engagement of the granular substance with the plates may be afforded by a corrugated plate in which the corrugations extend substantially perpendicular to the force of gravity, and it is a further object of the invention to provide a structure embodying such plates.

The bottom support for the granular substance, which support is usually of metal, has a different coefficient of expansion from the granular substance employed, usually sand, so that under different temperatures there will be disproportionate expansion and contraction of the metal bottom and the granular material, with consequent dislocation or distortion of the parts and possible damage. The resulting difference in expansion and contraction in the substance due to temperature change is due not only to the difference in co-efficient of expansion but also to the greater conductivity of the metal envelope over that of the granular substance within, as well as the bulk of the latter. Further the granular substance is subject to changing consolidation. In the case of sand it will be reduced in volume by any process or condition that will effect what is known as normal piling of the sand. This change of volume inevitably sets up stresses in the bottom support and in the attachments of it to the plates embedded in the sand. These stresses will set up compression in the bottom plate or support which tend to assist normal piling and thus reduce the volume of the granular mass and possibly effecting a leakage of the latter that may be disastrous. Likewise a stress of tension may be set up with like serious results.

It is a further object of the invention to provide "slack" in the metal bottom or support for the granular material whereby the said metal bottom may move in expansion or contraction as may be required by temperature or its relation to contiguous parts of the structure, so that there will be no undesirable stress or strains set up or any dislocation of the parts. By the term "slack" as used herein is meant that the part concerned has provision for extending or contracting under the stress imposed by contiguous parts or substances, or by temperature, without deleterious deformation or injury to the part or its dislocation with relation to contiguous parts.

The granular material is especially subject to dislocation by extraneous objects and to prevent this metal plates forming laminations may be placed upon or within the upper portion of the granular mass, the laminations readily adjusting themselves to the various conditions of construction and operation. Further the laminated metal plates have much greater resistance to penetration than a solid plate of equal thickness. This is of importance in connection with the roofs of shelters from bombs from aeroplanes to which structures the present invention is peculiarly adapted.

It is a further object of the invention to provide a structure of the character as indicated wherein laminated metal plates are placed within or upon the upper portion of the granulated mass.

The laminations are still more efficient especially as to projectile resisting ability if separated by layers of the granular material. It is a further object of the invention to provide a structure of the character as indicated wherein there is included a plurality of laminations separated from each other by layers of the granular material.

Other and ancillary objects of the invention will appear hereinafter.

In the accompanying drawings which illustrate the invention:

Fig. 1 is a side elevation, partly broken away, of a support, for any suitable load, embodying the invention;

Fig. 2 is a section, partly broken away, and on an enlarged scale, on the line 2—2 of Fig. 1;

Fig. 3 is a vertical section, partly broken away, of a roofing support for a bomb proof shelter or other structure, embodying the invention;

Fig. 4 is a fragmentary, perspective view showing a modified construction of the bottom support for the granular material and the securing thereto of the embedded plates which intersect the lines of stress in the granular material;

Fig. 5 is a vertical section, partly broken away, showing an arch construction embodying the invention;

Fig. 6 is a vertical section, partly broken away, of an improved cover construction for a sewer or conduit, which embodies the invention; and Fig. 7 is a fragmentary, perspective view showing a modified construction of the plates embedded in the granular substance and being transverse to the lines of stress in the granular material.

Referring to the drawings and first to Figs. 1 and 2, the I-beams 1 and 2 may be bolted to the separate supports 3 and 4. The I-beams are reenforced against spreading by means of the tiebolts 5 and 6. Between the I-beams is laid the slightly arched bottom support for the metal bottom holding the sand or other suitable granular material. This metal bottom comprises a series of pairs of channel bars of U-shaped cross section having the open side of the U upward, the bars of a pair lying adjacent to each other and having their adjacent flanges secured together. Thus the pair consisting of the U-bars 7 and 8 have their adjacent flanges 9 and 10 lying alongside each other, and between each of the adjacent bar flanges of a pair is inserted an upwardly extending wire meshed screen plate adapted to be transverse of the stresses in the granular material when the latter is placed in position on the slightly curved bottom. Thus between the adjacent flanges 9 and 10 of the bars 8 and 9 is inserted a wire meshed, screen plate 11, the flanges of the bars and the plate being securely soldered or otherwise fixed together. A temporary supporting arch 12 supports these pairs of channel bars and their upwardly extending plates as 11, in position during the laying up of the structure.

The contiguous flanges of adjacent pairs of U-shaped bars as referred to, are embraced by channel bars having their open sides downwardly, thereby sealing the metal bottom against any leakage of granular material between the bars and also insuring that the parts shall be in proper relation. Between the flanges of adjacent pairs of U-bars as referred to and also between such flanges and the flanges of the embracing U-bar as referred to, are clearances which provide slack whereby the pairs of the bottom may shift to accommodate themselves to changes wrought by temperature or in other ways, as hereinbefore referred to. Thus the flange 13 on the channel bar 8 of one pair and the flange 14 on the channel bar 15 of an adjacent pair are embraced by the channel bar 16 having its open side downwardly, and there being a clearance 17 between the pair of flanges 13 and 14 and there being also clearances 18 and 19 between the flanges 13 and 14 respectively and the flanges on the bar 16.

The metal bottom and the wire mesh screen plates having been built up as described, the sand or other non-coherent granular material 19 is placed upon the metal bottom between the I-beams and embedding the wire screen plates 11, the sand piling up at its upper portion above the plates 11.

Within the upper portion of the granular material are embedded metal laminae or plates 20, 21 and 22, extending even with or beyond the sides of the granular pile, such plates or laminae being substantially perpendicular to the direction of gravity. Upon the top of the granular pile rests the pedestal 23 supporting the weight of any desired structure 24, such as a tank or any other structure or device desired to be supported.

As stated, the support 12 is merely temporary and when the bottom has been assembled as stated and the granular material placed in position, the support 12 may be removed.

If the span of the support is too great it might be that it would collapse from the weight of its own structure and not be in position to act as a support for sustaining a weight. To provide for such wide span one or more pillars or supports should be placed intermediate to the span at suitable intervals to sustain the structure against collapsing under its own weight when it will provide a strong support for sustaining great weights. Thus, referring to Fig. 3, there are concrete abutments 25 and 26 in which are anchored I-beams 27 and 28 which are connected by tie-rods 29 and 30 to prevent them from separating if the horizontal resistance of the abutments 25 and 26 are insufficient to withstand the horizontal thrusts of the anchor.

Between the supports 25 and 26 is a pillar or support 31 carrying the I-beam 32. Between the support 25 and the I-beam 32 is an arched, metal bottom 33 similar to the metal bottom of Figs. 1 and 2, for supporting the granular material 34 such as sand, a similar arched, metal bottom extending between the I-beam 32 and the support 26.

Embedded within the sand 34 are the wire screen plates 35 transverse to the lines of stress in the granular material 34 when a load is supported on such granular material, and such plates 35 are secured to the metal bottoms in the same manner as described in connection with the structure of Figs. 1 and 2.

In the upper portion of the body 34 of granular material are the metal laminae or plates 36 and 37 having the body of granular material 38 between them, such metal plates or laminae extending substantially perpendicular to the direction of gravity.

Referring to Fig. 5, there is therein shown an arch construction embodying the invention. Thus the concrete supports 39 and 40 have extending between them a metal bottom support 41 formed of U-bars in the manner as described in connection with the structure of Figs. 1 and 2. Also extending from and secured to the bottom 41 in the manner as described in connection with the structure of Figs. 1 and 2 are the wire screen plates 42.

The abutments 39 and 40 are ordinarily designed to withstand the horizontal thrust produced by the structure as referred to. If, however, such abutments are not sufficiently rigid, or of sufficient strength to withstand such thrust, a tie-bar 43 may be employed. The ends of the tie-bar 43 are anchored in the concrete supports 39 and 40, the turn-buckle 44 being provided in the tie-bar for adjusting its tension. Where the abutments 39 and 40 are sufficiently rigid and strong the tie-bar would not be necessary.

Some of the plates 42 in this case are at slight angles with the vertical to conform to the curvature of the arch but still intersect the lines of stress occasioned in the granular material by any supported load. Also the metal laminae or plates 46 and 47 are curved to conform to the curvature of the arch.

In case of disaster, such as the bombing of cities, it is of extreme importance that the water mains, sewers and other sanitary and supply means should escape injury. This may be done with great efficiency and reliability by means of a structure as illustrated in Fig. 6. In that figure a subway conduit or cavity 48 in which is contained a water or sewer pipe or other essential equipment 49 is surrounded by a concrete structure 50 having a recess 51 in its upper side in which is placed a metal bottom 52 for the granular substance 53, such as sand. The bottom 52 is of the same construction as the metal bottom for the granular substance in Figs. 1 and 2, and there is secured to such bottom and embedded in the granular material 53, the wire screen plates 54 all in the same manner as described in connection with the structure of Figs. 1 and 2.

In the upper part of the granular material of Fig. 6, are embedded the metal laminae or plates 55, 56 and 57, which laminae are also separated from each other by the granular material, and such laminae extend substantially at right angles to the direction of gravity.

A strong support against anything tending to break in from above upon the sewer pipe or other structure in the subway conduit, is thus provided and this, by reason of the metal laminae or plates in connection with the remainder of the structure provide a peculiarly efficient means for preventing the penetration of bombs dropped from above.

Instead of forming the bottom support for the granular material of U-bars as above described, such bottom might be formed of a corrugated metal plate, the corrugations extending substantially parallel to the wire screen plates as before referred to, the corrugations of the plate providing the necessary slack for permitting the expansion and contraction of the plate to adjust itself to the various conditions of stress, contraction and expansion for which purpose the clearances between the U-bars were provided in the structures hereinbefore referred to.

Thus, referring to Fig. 4, the corrugated plate 58 may be provided as the supporting bottom for the granular material instead of the U-bars in the structures hereinbefore referred to, and the wire screen plates 59 may be secured thereto, with their planes substantially parallel to the corrugations, by means of tabs as 60 integral with the wire screen plates and soldered to the corrugated bottom plate 58, which wire screen plates 59 performing the same functions as the similar plates 11 of Fig. 1 and the corresponding plates in the other figures.

Also the wire screen plates might be replaced by corrugated plates having their corrugations substantially perpendicular to the direction of gravity, the corrugations providing lodgement for the granules of the body of granular substance which resists sliding of the substance under the force of gravity along the plate. Thus a corrugated bottom plate 61 or other bottom for the granular substance may have secured to it the corrugated plates 62 in place of the wire screen plates, the corrugations of the plates 59 being substantially perpendicular to the direction of gravity. The plates 62 may be secured to the plate 61 by means of tabs 63 integral with the plates 62 and soldered to the plate 61.

While the invention has been illustrated in what are considered its best applications it may have other embodiments without departing from its spirit and is not, therefore, limited to the structures shown in the drawings.

What I claim is:

1. A supporting structure comprising lateral supports, an interposed body of sand or other non-coherent granular substance, an under support therefor and spaced apart plates embedded in the granular body, such plates being transverse of the line of stress in said granular body and secured to said under support, said under support having slack to permit relative movement of its parts to adapt itself to changing conditions.

2. A supporting structure comprising lateral supports, an interposed body of sand or other non-coherent granular substance, an under support therefor and spaced apart plates embedded in the granular body and secured to said under support, such plates being transverse of the line of stress in said granular body, said under support comprising U-shaped bars opening upward and U-shaped bars opening downward and embracing adjacent flanges of the aforesaid U-shaped bars, there being clearances between said U-bars to provide slack for permitting relative movement of said U-bars.

ALFRED V. SIMS.